United States Patent [19]

Fidric

[11] Patent Number: 5,311,603
[45] Date of Patent: May 10, 1994

[54] HIGHLY EFFICIENT SUPERFLUORESCENT FIBER LASER/AMPLIFIER FOR INTERFEROMETRIC SENSORS

[75] Inventor: Bernard G. Fidric, Woodland Hills, Calif.

[73] Assignee: Litton Systems Inc., Beverly Hills, Calif.

[21] Appl. No.: 967,486

[22] Filed: Oct. 28, 1992

[51] Int. Cl.$^5$ .......................... G02F 1/01; G02B 6/16
[52] U.S. Cl. ........................................ 385/11; 372/6
[58] Field of Search ...................... 385/11, 12, 13, 27, 385/39; 372/6, 69

[56] References Cited

U.S. PATENT DOCUMENTS

| | | | |
|---|---|---|---|
| 4,637,025 | 1/1987 | Snitzer et al. | 372/1 |
| 4,859,016 | 8/1989 | Shaw et al. | 350/96.15 |
| 4,901,084 | 2/1990 | Huguenin et al. | 342/179 |
| 4,938,556 | 7/1990 | Digonnet et al. | 385/27 |
| 4,964,131 | 10/1990 | Liu et al. | 372/6 |
| 5,136,600 | 8/1992 | Fidric et al. | 372/32 |
| 5,148,444 | 9/1992 | Berger | 372/94 |

OTHER PUBLICATIONS

Theory of Superfluorescent Fiber Laser by M. Digonnet, Jr. Lightwave Technology, vol. 4, N11, Nov., 1986, pp. 1631-1639.

Primary Examiner—Akm E. Ullah

[57] ABSTRACT

A superfluorescent broadband fiber laser source comprises an optical fiber doped with a laser material and having one end pumped with pump light of sufficient intensity to produce amplified spontaneous emission within the fiber and forward and backward waves therefrom. The polarizations of the backward wave experiences a 45° rotation as it travels into and another 45° rotation as it passes back out of a 45° Faraday rotator mirror device. An amplified polarizationrotated beam from the doped fiber is divided into orthogonally polarized beams in a polarization beam splitter coupler. A return polarized signal from an interferometer is passed through the doped fiber, the Faraday rotator mirror device and the doped fiber for producing a polarized output signal that has been amplified by four passes through the doped fiber.

24 Claims, 1 Drawing Sheet

HIGHLY EFFICIENT SUPERFLUORESCENT FIBER LASER/AMPLIFIER FOR INTERFEROMETRIC SENSORS

BACKGROUND OF INVENTION

This invention relates to optical fiber lasers and amplifiers and more particularly to superfluorescent broadband fiber lasers.

Superfluorescent broadband doped fiber laser sources are described in U.S. Pat. Nos. : 4,637,025 to Snitzer, et, al.; 4,938,556 to Digonnet, et.al., which is a continuation in part of 4,859,016 to Shaw, et. al., which is a division of 4,723,824 which is a division of 4,674,830 (all for fiber optic amplifiers); and 5,136,600 to Fidric, et.al., which are incorporated herein by reference. The superfluorescent fiber lasers and amplifiers in the patents generally comprise an optical fiber having it's core or cladding or both doped with an active laser material and pumped at an appropriate frequency and sufficient intensity to produce amplified spontaneous emission (ASE). These patents disclose both single pass and double pass configurations. In a single pass configuration the output signal results from only one pass amplification of the spontaneous emission. In a double pass configuration a dichroic filter or a mirror and coupler are employed to reflect the backward spontaneous emission signal (not the pump signal) back through the doped fiber for second-pass amplification of the spontaneous emission. Unfortunately these superfluorescent sources are quite sensitive to optical feedback of the output signal in the doped fiber, which causes an onset of oscillating modes and a resultant narrowband emission. Such an oscillating condition prevents operating these devices as high power broadband light sources. An alternate approach is a resonant laser light source described in U.S. Pat. No. 4,964,131 to Liu, et. al. which is pumped at a wavelength selected to be outside the pump variable tuning range of the lasing material, e.g., Neodynium. This resonant laser has been found to be less efficient and considerably less stable wavelength wise in comparison to the referenced double pass fiber sources.

An object of this invention is the provision of an improved superfluorescent source. Another object is the provision of such a source that has an efficiency and a stability comparable to conventional double pass configurations and which has as high a resistance to optical feedback as the single pass approach. Another object is the provision of a source of polarization selective superfluorescent emission output light that can be operated on in a utilization device (e.g., interferometric sensors) and reapplied to the doped fiber for producing an amplified output signal having a prescribed polarization and that is the result of photons being amplified four times through the gain medium of the doped fiber.

SUMMARY OF INVENTION

In accordance with this invention an improved superfluorescent fiber laser source comprises a doped optical fiber responsive to pump light for inducing superfluorecent emission of laser light and forward and backward wave signals outputted from one and other ends thereof, means for rotating by a prescribed amount the polarizations of the backward wave emission from the other end of the doped fiber, and means for directing the polarization rotated backward emission back into the other end of the doped fiber for amplification of the polarization rotated wave as it traverses the doped fiber in the forward direction and passes out of the one end of the doped fiber. In an amplifier, the pump signal and a signal to be amplified are both launched into the one end of the doped fiber. In a preferred embodiment of the source the rotating means and directing means together comprise a Faraday rotator mirror device which rotates the polarizations of the backward wave a total of 90° as it travels into and back out of the Faraday device. The polarization-rotated amplified forward wave emission signal from the one end of the fiber is applied to a polarization beam splitter coupler for providing orthogonally polarized output signals at first and second output ports thereof. The pump signal and polarization rotated amplified forward wave signal may be coupled to and from the one end of the doped fiber by a wavelength division multiplexer coupler.

BRIEF DESCRIPTION OF DRAWING

This invention will be more fully understood from the following detailed description thereof together with the single figure of drawing which is a schematic block diagram of one embodiment of this invention.

DETAILED DESCRIPTION OF INVENTION

Figure 1:
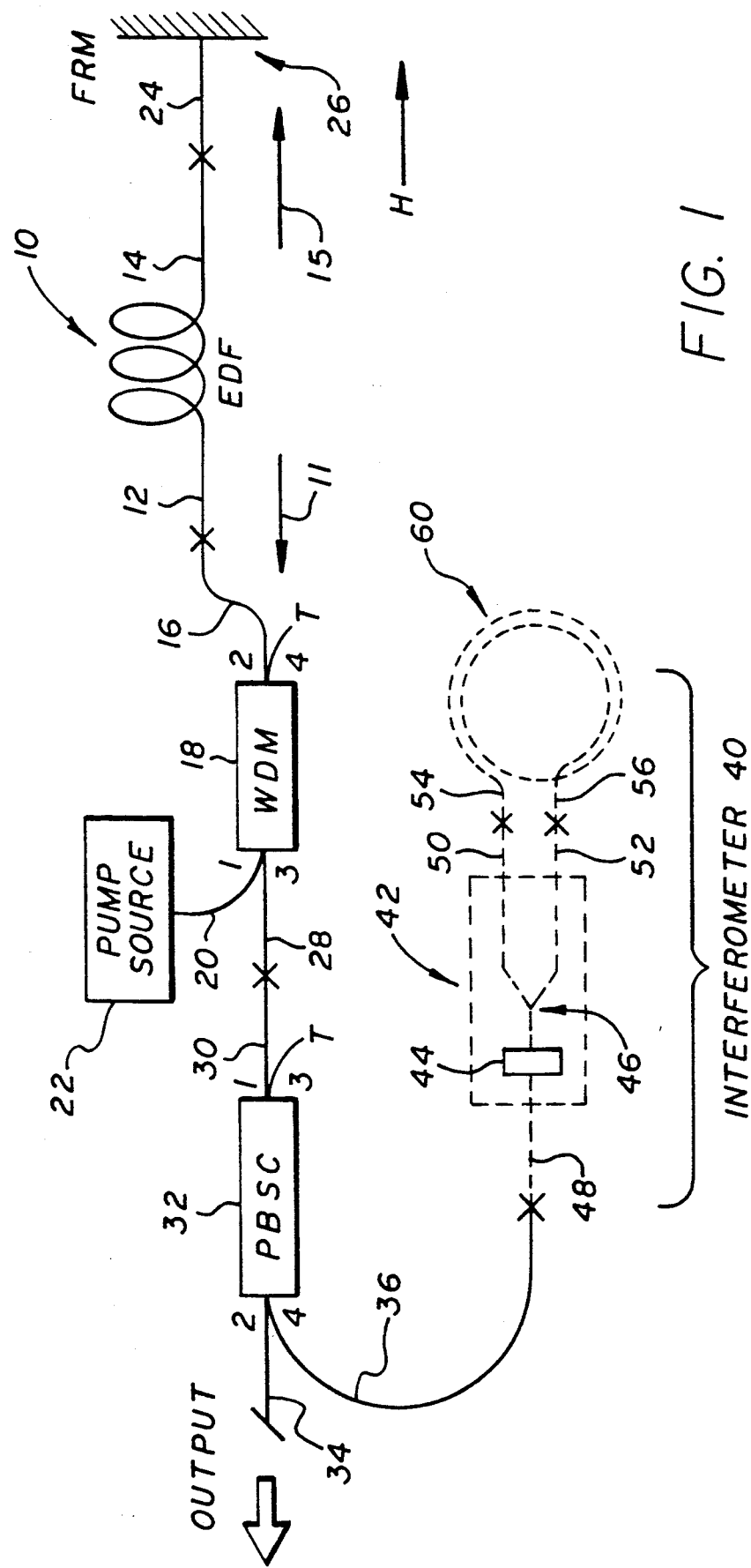

An interferometer system embodying this invention is shown in the single figure of drawing where the system comprises a length of erbium doped fiber 10, for example, having one end 12 connected through a length of fiber 16 to a wavelength division multiplexer coupler 18 and having its other end 14 connected through a length of fiber 24 to a Faraday rotator mirror device 26; a source 22 of pump light signal; a polarization beam splitter coupler 32; and a Sagnac interferometer 40 comprising a multifunction integrated optic chip (MIOC) 42 (comprising a polarizer 44, a Y-junction 46, an input lead 48 and two output leads 50 and 52) and a coil 60 of optical fiber.

The couplers 18 and 32 are conventional and both are preferably 4 port devices that are connected together and to the doped fiber 10 and to the interferometer 40. The x's in the drawing indicate places where various fibers are spliced together. The fibers 30, 34, 36 and 48 are preferably polarization maintaining fibers (PMF). The birefringence axes of fibers 36 and 48 should be properly aligned during the splicing operation. In contrast, the fibers 10, 16, 20, 24 and 28 may be regular single mode fiber (SMF), except for proper doping of gain fiber 10.

Wavelength division multiplexer couplers are frequency sensitive devices that are described in U.S. Pat. Nos.: 4,556,279; 4,515,431; and 4,674,830, which are incorporated herein by reference. The multiplexer coupler 18 is operative for coupling substantially 100% of the pump signal wavelength into port 1 and out of port 2 for being launched into the one end 12 of the doped fiber 10. This coupler 18 is also operative for coupling substantially 100% of the signal wavelength emission in the forward direction (indicated by arrow 11) from the doped fiber into multiplexer coupler port 2 and out of port 3 for transmission to port 1 of the coupler 32. The pump signal is blocked from this output port 3 of the multiplexer coupler. Port 4 of the multiplexer coupler is coupled to a light absorbing termination T.

Polarization beam splitter couplers are polarization sensitive devices and are described in ones of the U.S. Pat. Nos. : 5,150,370; 5,127,066; 5,030,842; 4,985,898; 4,886,334; 4,063,084; and 3,976,838, which are incorporated herein by reference; and are commercially available devices (e.g., model AFOC-S-1.55, available from Photonetics). The splitter coupler 32 is operative for coupling 100% of only one polarization between ports 1 and 2 and onto the output fiber 34, and for coupling 100% of only an other orthogonal polarization between ports 1 and 4 and to a utilization device such as the interferometer 40. The port 3 of splitter coupler 32 is connected to a light absorbing termination T.

The Faraday rotator mirror device 26 is a commercially available device and may be a model I-15-FRM manufactured by ISOWAVE. This Faraday rotator mirror essentially comprises a thin plate of magneto-optic material having a magnetic field applied thereto in the direction 15 of the backward emission (i.e., orthogonal to the plane of the face of the plate), with the backside of the plate being mirrored. The thickness of the plate is selected to provide 45° polarization rotation to a light beam passing through it to the mirrored surface and another 45° polarization rotation as this light beam travels back through the magneto-optic material. Thus, the Faraday rotator mirror device 26 not only reflects the backward wave superfluorescent emission, but also rotates its state of polarization by 90°. A commercially available Faraday rotator mirror device usually has a fiber pigtail and a microlens associated with it to facilitate coupling the light to the magneto-optic plate.

The interferometer 40 is conventional and comprises a multifunction integrated optic circuit (MIOC) 42 and a coil 60 of preferably polarization maintaining fiber. The circuit 42 comprises a polarizer 44 having its axis aligned with one of the birefringence axes of the input fiber lead 48 and a Y-junction that divides the input signal from the splitter coupler 32 and combines the output signals from opposite ends 54 and 56 of the coil 60. The circuit 42 is connected to port 4 of the polarization beam splitter coupler (PBSC) by a length of polarization maintaining fiber 36. Although a Sagnac interferometer is illustrated in the drawing, typically most any interferometer may be used here. Also, other types of utilization devices such as an optical time domain reflectometer ma be connected to the output port 4 of the splitter coupler.

The doped optical gain fiber 10 is conventional. The doped fiber 10 is a superfluorescent source (SFS) of amplified spontaneous emission at an optical frequency when it is pumped with light of appropriate (usually shorter) wavelength and of sufficient intensity. A theoretical analysis of superfluorescence or amplified spontaneous emission is found in U.S. Pat. No. 4,938,556 to Digonnet, et. al. at columns 9–11 and the article Theory of Superfluorescent Fiber Laser by M. Digonnet, et. al., Journal of Lightwave Technology, Vol. 4, No. 11, November, 1986, pp. 1631–1639, which are incorporated herein by reference. The doped fiber 10 is preferably a single mode optical fiber formed of silica glass and having its core or cladding or both doped with at least one active laser material such as Neodymium or Erbium. The doped fiber lases to produce forward (11) and backward (15) emission (exiting the left and right sides 12 and 14 of fiber 10, as viewed in the drawing) light beams at emission or signal wavelengths in response to pump light of sufficient intensity and appropriate wavelength.

In operation, unpolarized pump light from source 22 is coupled between ports 1 and 2 of the multiplexer coupler and launched into the core of the doped fiber. The intensity and wavelength of the pump light are selected to be sufficient to cause the doped fiber to produce amplified spontaneous emission, which is unpolarized light, that is outputted in the forward and backward waves 11 and 15. The forward wave travels between ports 2 and 3 of the multiplexer coupler to be a weak output signal on fiber 28. Indeed, this output signal has been amplified only once as it made one pass through the doped fiber. On the other hand, the backward wave signal 15 also undergoes amplification during a single pass of the doped fiber prior to it's polarization being rotated 90° as it traverses the Faraday rotator mirror device. The polarization rotated reflected backward wave signal is again amplified as it travels from right to left in the drawing through the length of the gain medium of the doped fiber. This causes an increase in the intensity of the resultant emission and a strong output signal on fibers 16 and 28. Since the polarization of the reflected backward wave signal are rotated 90° relative to the incident beam (the initial backward wave 15 in the doped fiber), however, this prevents regenerative amplification of optical feedback from the other end 14 (right) of the doped fiber so as to prevent the onset of oscillations within the doped fiber with the resultant linewidth narrowing of the output signal thereof. Thus, this double pass structure provides a broadband output signal on fibers 16 and 28 that has the intensity of a double pass system and increased stability.

Since this light signal on fiber 28 is unpolarized (i.e., it is comprised of orthogonal polarizations that vary randomly), the splitter coupler causes one polarization (e.g., the x-polarization, for simplicity of illustration) to be passed by port 2 onto output fiber 34 and the orthogonal polarization (the y-polarization) to be passed by port 4 to the polarization maintaining fiber 36, polarizer 44 and Y-junction 46 where it is split into equal amplitude beams that are applied as counter-rotating beams of only the y-polarization in fiber coil 60. Any rotation of the interferometer is sensed as a change in the optical phase of the signals in the coil 60 and does not change the polarizations of these signals. The counter rotating beams in the coil 60 are recombined in the Y-junction 46 and passed by the polarizer 44 and polarization maintaining fiber 36 with the same polarization that the light signal had when it was traveling in the opposite direction. This return signal is coupled between ports 4 and 1 of the polarization splitter coupler and ports 3 and 2 of the multiplexer coupler and launched into the doped fiber 10 in essentially the same polarization it had when it left the doped fiber. Although fibers 10, 16 and 28 are not polarization maintaining fibers, by principle of reciprocity, and thanks to the very large speed of light, any polarization effect experienced through these fibers by the initial signal leaving the doped fiber cancels out on its return pass.

This return signal is amplified as it passes (in the direction 15) a third time through the doped fiber 10. The polarization of the amplified return signal is then rotated 90° by the operation of the Faraday rotator mirror device 26 prior to its being again amplified as it passes a fourth time through the doped fiber in the forward direction 11. Since the amplified interferometric signal in the forward direction 11 on fibers 16 and 28 has traversed the gain medium of the doped fiber 4 times, it has considerably more amplitude than the corresponding output signal of the prior art double pass system. The second rotation of the polarization of the interferometric signal by the Faraday rotator mirror device, however, again prevents the onset of unwanted regenerative amplification of optical feedback and the resultant onset of oscillations in the gain medium of the doped fiber. The amplified interferometric signal is coupled through ports 2 and 3 of the multiplexer coupler and ports 1 and 2 of the splitter coupler (this signal is x-polarized at this time/point) to the output fiber 34 where it is applied to processing circuitry (not shown).

This invention has the distinct advantage of operating as a source of a broadband light signal on fibers 16 and 28 that has undergone double pass amplification, but which has increased resistance to oscillation. This invention also operates to provide a very efficient broadband fiber source of single polarization light signal at the output ports 2 and 4 of the splitter coupler. This invention has the further advantage of providing an output signal on fiber 34 from a utilization device such as an interferometer that undergoes further double pass amplification with the same increased resistance to oscillation. In a conventional double pass system the output signal of the interferometer is typically 10–20 microwatts. The corresponding output signal in fiber 34 utilizing this invention should be a number of milliwatts. Although this invention is described in relation to preferred embodiments thereof, variations and modifications will appear to those skilled in the art. By way of example, the light source structure may be used in conjunction with other types of interferometric devices and with utilization devices other than interferometers, and may be operated as a light signal amplifier. Also, the utilization device connected to port 4 of the splitter coupler may be a time domain reflectometer. The reflectometer essentially uses incident light output of port 4 of the splitter coupler to probe an optical circuit, looking for defects therein such as in a splice that will emit back scattered light. In accordance with this invention the back scattered light will undergo double pass amplification in the doped fiber 10 prior to being outputted on fiber 34. The scope of this invention is therefore to be determined from the appended claims.

What is claimed is:

1. Apparatus comprising:
   a source of pump light having a pump wavelength;
   an optical fiber having one and other ends thereof and being doped with laser material possessing a laser transition at a signal wavelength when the doped fiber is illuminated with said pump light;
   means for applying said pump light and a first light signal of the signal wavelength to one end of said doped fiber;
   means for rotating by a predetermined amount the polarizations of an amplified first light signal from the other end of said doped fiber;
   means for directing the polarization rotated first light signal back into the other end of said doped fiber; and
   means for passing the first light signal of the signal wavelength from the one end of the doped fiber as an amplified first light signal output of said apparatus.

2. Apparatus according to claim 1 wherein said directing means directs said rotated first light signal back through said rotating means for further rotating the polarizations thereof by the predetermined among, wherein twice the predetermined amount is sufficient to prevent regenerative amplification of the first light signal and oscillation in the doped fiber.

3. Apparatus according to claim 2 wherein said rotating means and directing means together comprise a Faraday rotator mirror means and said predetermined amount of polarization rotation is substantially 45° for a total polarization rotation of substantially 90°.

4. Apparatus according to claim 3 wherein said first light signal has a reference polarization.

5. Apparatus according to claim 4 wherein said applying means comprises a wavelength division multiplexer (WDM) coupler having at least three ports, said multiplexer coupler coupling a pump signal of the pump wavelength only between said first and second ports and vice versa, and coupling a first light signal of the signal wavelength only between said second and third ports and vice versa.

6. Apparatus according to claim 5 wherein said passing means comprises a polarization beam splitter coupler having at least three ports, said splitter coupler coupling only a first light signal having the reference polarization (without rotation) between said first and second ports thereof and vice versa, and coupling only a first light signal in which the reference polarization is rotated 90° at the third port of said multiplexer coupler between said first and third ports of said splitter coupler.

7. Apparatus comprising:
   a pump source for emitting pump light signals at a first wavelength;
   an optical fiber having one and other ends thereof and being doped with laser material and possessing a laser transition at a signal wavelength for producing broadband superfluorescent emission of a first light signal at a second wavelength when said one end of the doped fiber is illuminated with pump light of sufficient intensity to induce superfluorescent emission of laser light;
   means for launching pump light into said one end of said doped fiber;
   means for rotating by a predetermined amount the polarizations of the first light signal in a backward wave from the other end of said doped fiber; and
   means for directing the polarization rotated first light signal back into the other end of said doped fiber for amplifying the polarization rotated first light signal moving in the forward direction.

8. Apparatus according to claim 7 wherein said directing means directs said rotated first light signal back through said polarization rotation means for further rotating the polarizations thereof by the predetermined amount.

9. Apparatus according to claim 8 wherein said rotating means and said directing means together comprise a Faraday rotator mirror means and said predetermined amount of polarization rotation is substantially 45° for a total polarization rotation of substantially 90°.

10. Apparatus according to claim 9 wherein said launching means comprises a wavelength division multiplexer coupler having at least three ports, said multiplexer coupler coupling a pump signal of the pump wavelength only between said first and second ports and vice versa, and coupling a first light signal having said signal wavelength only between said second and third ports and vice-versa.

11. Apparatus according to claim 10 further comprising a polarization beam splitter coupler having at least three ports with said first port receiving the output of said third port of said multiplexer coupler, said splitter coupler coupling only one polarization of the first light signal between said first and second ports thereof and vice-versa, and coupling only an other polarization of the first light signal between said first and third ports thereof and vice versa.

12. Apparatus according to claim 11 wherein the one and other polarizations are orthogonal to each other.

13. Apparatus comprising:
   a source of pump light having a first wavelength;
   an optical fiber doped with a laser material, said doped fiber being responsive to said pump light of launched into one end of said fiber for causing superflourescent broadband emission light to be generated therein at a second wavelength; and
   Faraday rotator mirror means for rotating by a prescribed amount the polarizations of said superfluorescent emission in a backward wave first light signal from the other end of said doped fiber and launching a polarization rotated first light signal back into said other end of said doped fiber for further amplification by the latter.

14. Apparatus according to claim 13 further comprising a wavelength division multiplexer coupler having at least three ports, said multiplexer coupler coupling said pump signal only between first and second ports thereof and vice versa with said second port being connected to said one end of said doped fiber, and coupling only the amplified first light signal exiting said one end of said doped fiber between said second and third ports of said multiplexing coupler and vice versa.

15. Apparatus according to claim 14 further comprising a polarization beam splitter coupler having at least three ports; a first port thereof being connected to said third port of said multiplexing coupler; said splitter coupler coupling between said first and second ports thereof and vice versa only one polarization of said first light signal from said multiplexer coupler; and coupling only an other polarization of the first light signal from said multiplexer coupler between said first and third ports of said splitter coupler and vice versa.

16. Apparatus according to claim 15 wherein said one and other polarizations of said first light signal are orthogonal.

17. Apparatus according to claim 16 wherein said predetermined amount of polarization rotation is 90°.

18. Apparatus according to claim 17 further comprising utilization means and first polarization maintaining means connecting said utilization means to said third port of said splitter coupler for maintaining the other polarization of said first light signal that is to be applied to said utilization means.

19. Apparatus according to claim 18 wherein said first polarization maintaining means comprises a first polarization maintaining fiber and said utilization means comprises an interferometer comprising
   an interferometric sensing coil means fabricated of a polarization maintaining fiber and operative for sensing rotation thereof;
   a polarizer having one side thereof connected to one end of said polarization maintaining fiber and oriented to pass only said other polarization of the first light signal that is passed at said third port of said splitter coupler;
   interferometric coupler means having a first port connected to the other side of said polarizer and having second and third ports continued to opposite ends of said sensing coil means;
   said interferometric sensing coil means being responsive to a first light signal of said other polarization therein from said third port of said splitter coupler for sensing rotation of said interferometer and impressing an indication thereof onto said first light signal therein and returning said first light signal with said other polarization through said splitter coupler and multiplexer coupler and said doped fiber for amplification therein and subsequent polarization rotation from said other to said one polarization by said Faraday rotator mirror means and further amplification in said doped fiber and transmission through said multiplexer coupler and splitter coupler to said second port of said splitter coupler as an amplified output signal of the one polarization.

20. Apparatus comprising:
   an interferometer;
   a broad band light source comprising:
      a lasing medium;
      a pump light source that pumps said lasing medium for causing said lasing medium to emit signal light from one and other ends thereof; and
      first means for rotating the polarizations of signal light from said other end of said lasing medium sufficiently to substantially suppress regenerative amplification and oscillation in said lasing medium and redirecting the polarization rotated signal light into said other end of said laser medium for amplification in the latter; and
   second means for coupling an amplified and polarization rotated light signal from said one end of said lasing medium to said interferometer.

21. Apparatus according to claim 20 wherein said first means rotates the polarization of signal light substantially 90°.

22. Apparatus according to claim 21 wherein said second means couples an amplified polarization rotated light signal to and from said interferometer for passing said polarization rotated light signal through said lasing medium to said first means and back through said lasing medium for further amplification on each pass through said lasing medium.

23. Apparatus according to claim 22 wherein said second means couples polarization rotated signal light of one polarization to and from said interferometer and couples polarization rotated signal light of other polarization to an output terminal of said second means.

24. Apparatus according to claim 23 wherein said second means couples the series combination a wavelength division multiplexer coupler and a polarization beam splitter coupler with the former connected to the one end of said lasing medium and the latter connected to said interferometer.

* * * * *